Patent Number: 4,920,208
… Date of Patent: Apr. 24, 1990

[54] BASIC AZO DYESTUFFS

[75] Inventor: Aloysius Engel, Leverkusen, Fed. Rep. of Germany

[73] Assignee: Bayer Aktiengesellschaft, Leverkusen, Fed. Rep. of Germany

[21] Appl. No.: 250,572

[22] Filed: Sep. 28, 1988

[30] Foreign Application Priority Data

Oct. 17, 1987 [DE] Fed. Rep. of Germany ....... 3735276

[51] Int. Cl.$^5$ .................. C09B 29/52; C09B 31/14; C09B 32/215; C09B 35/26
[52] U.S. Cl. .................. 534/753; 534/757; 534/759; 534/775; 534/582; 534/581
[58] Field of Search ............. 534/753, 757, 759, 775

[56] References Cited

U.S. PATENT DOCUMENTS

| | | | |
|---|---|---|---|
| 4,013,073 | 6/1977 | Mory et al. | 534/753 |
| 4,229,343 | 10/1980 | Junge et al. | 534/775 X |
| 4,285,861 | 8/1981 | Brode et al. | 534/775 X |
| 4,525,583 | 6/1985 | Adam | 534/775 X |

FOREIGN PATENT DOCUMENTS

| | | | |
|---|---|---|---|
| 2434432 | 2/1975 | Fed. Rep. of Germany | 534/759 |
| 2540803 | 4/1976 | Fed. Rep. of Germany | 534/753 |
| 513462 | 10/1939 | United Kingdom | 534/753 |

OTHER PUBLICATIONS

Adam II, Chemical Abstracts, vol. 102, No. 63573j (1985).
DeGraw et al., Journal of Medicinal Chemistry, 14(3), pp. 206–210 (1971).
McKay, Chemical Abstracts, vol. 78, No. 31407c (1973).
Pedrazzi, Chemical Abstracts, vol. 106, No. 6403n (1987).

*Primary Examiner*—Floyd D. Rigel
*Assistant Examiner*—Fiona T. Powers
*Attorney, Agent, or Firm*—Sprung, Horn, Kramer & Woods

[57] ABSTRACT

Basic azo dyestuffs of the general formula

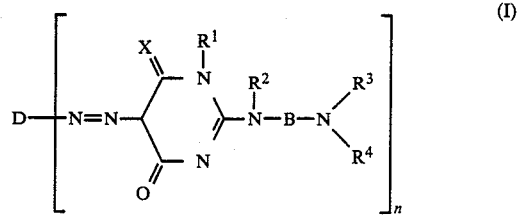

and tautomers thereof, in which
  D is the radical of a diazo or tetrazocomponent free of anionic groups,
  X is O or NH,
  $R^1$, $R^2$ are hydrogen, alkyl or aryl,
  B is a bridge member and
  $R^3$, $R^4$ are hydrogen, alkyl, alkenyl or aralkyl or
  $R^2$ and $R^3$ together with B and the two nitrogen atoms to which they are bonded form a 5- or 6-membered heterocyclic and in this case B also stands for a direct bond, or
  $R^3$ and $R^4$ together with the nitrogen atom to which they are bonded form a 5- or 6-membered heterocyclic,
  n is 1 or 2, and in which
the cyclic and acyclic radicals can in turn be substituted by radicals customary in dyestuff chemistry, find utility for dyeing and coloring synthetic and natural materials.

5 Claims, No Drawings

BASIC AZO DYESTUFFS

The invention provides basic azo dyestuffs of the general formula

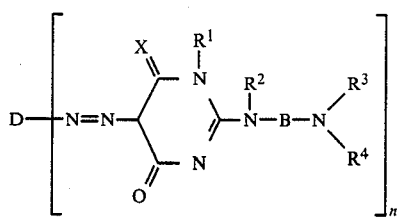
(I)

and tautomers thereof, in which
  D is the radical of a diazo or tetrazocomponent free of anionic groups,
  X is O or NH,
  $R^1$, $R^2$ are independently of each other hydrogen, alkyl or aryl,
  B is a bridge member and
  $R^3$, $R^4$ are independently of each other hydrogen, alkyl, alkenyl or aralkyl or
  $R^2$ and $R^3$ together with B and the two nitrogen atoms to which they are bonded form a 5- or 6-membered heterocyclic and in this case B also stands for a direct bond,
  $R^3$ and $R^4$ together with the nitrogen atom to which they are bonded form a 5- or 6-membered heterocyclic,
  n is 1 or 2, and in which the cyclic and acyclic radicals can in turn be substituted by radicals customary in dyestuffs chemistry, and their preparation and their use for dyeing and colouring synthetic and natural materials dyeable and colourable with basic dyestuffs.

D stands in particular for a monoazo or bisdiazocomponent of the benzene, naphthalene or heteroaromatic series.

Alkyl radicals are in particular those having 1-8 C atoms and alkenyl radicals in particular those having 2-4 C atoms.

Substituents of the alkyl and aryl radicals are for example halogen, preferably flourine, chlorine or bromine, hydroxyl, $C_1$–$C_4$-alkoxy, cyano, amino, mono- and di-$C_1$–$C_4$-alkylamino. The aryl radicals can additionally be substituted by $C_1$–$C_4$-alkyl.

Aryl stands preferably for phenyl.

Preferably, aralkyl stands for benzyl or phenylethyl, which each can be substituted for example in the phenyl nucleus by flourine, chlorine, bromine, $C_1$–$C_4$-alkyl, $C_1$–$C_4$-alkoxy, nitro, cyano, amino, mono- and di-$C_1$–$C_4$-alkylamino.

The bridge member B stands preferably for optionally —O—, —S—,

interrupted $C_2$–$C_4$-alkylene, in which $R^5$ stands for hydrogen, methyl, optionally chlorine-, bromine-, hydroxy-, cyano-, $C_1$–$C_4$-alkoxy-, amino-, mono- and di-$C_1$–$C_4$-alkylamino-substituted $C_2C_4$-alkyl, or flourine-, chlorine-, bromine-, $C_1$–$C_4$-alkyl- or $C_1$–$C_4$-alkoxy-substituted aryl, preferably phenyl, or B stands for a radical of the formula

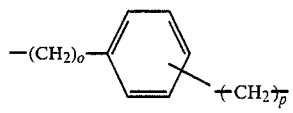

o denotes 0, 1, 2 or 3 and
p denotes 1, 2 or 3 and $(CH_2)_p$ is bonded to the radical $NR^3R^4$.

The phenylene radical can additionally be substituted by $C_1$–$C_4$-alkyl, $C_1$–$C_4$-alkoxy, chlorine or bromine.

Where $R^2$ and $R^3$ together with the bridge member B and the two nitrogen atoms attached thereto form a 5- or 6-membered ring, B stands for a direct bond, —$CH_2$— or —$CH_2$—$CH_2$—.

Of the dyestuffs of the formula (I) preference is given to the dyestuffs of the formula

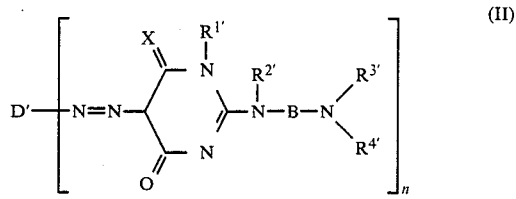
(II)

in which
  n is 1 or 2,
  X denotes O or NH,
  D' denotes a radical of the formula

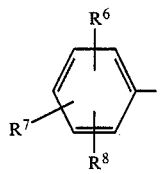

if n=1 or a radical of the formula

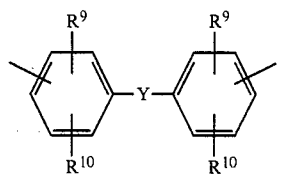

if n=2, in which
  $R^6$ and $R^7$ are independently of each other hydrogen, $C_1$–$C_4$-alkyl, $C_1$–$C_4$-alkoxy, fluorine, chlorine, bromine, amino-, mono-, or di-$C_1$–$C_4$-alkylamino-substituted $C_2$–$C_4$-alkyl, $CONHR^{11}$ or $SO_2NHR^{11}$,
  $R^{11}$ is $C_1$–$C_4$-alkyl, or amino-, mono- or di-$C_1$–$C_4$-alkyl-amino-, N-pyrrolidine-, N-morpholine-, N-piperazine-, N-hexahydropyridazine-, N-hexahydropyrimidine-substituted $C_2$–$C_4$-alkyl,
  $R^8$ has independently of $R^6$ and $R^7$ the meaning specified therefor or a radical of the formula

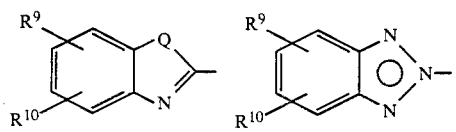

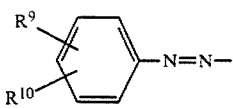

$R^9$ and $R^{10}$ are independently of each other hydrogen, $C_1$–$C_4$-alkyl, $C_1$–$C_4$-alkoxy, chlorine or bromine, Q stands for O, S, or NH and Y stands for a direct bond or —CONH—, —CO—, —NHCONH—, —CH$_2$—, —CH$_2$CH$_2$—, —CH=CH—, —C(CH$_3$)$_2$—,

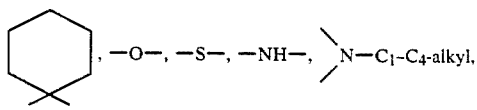, —O—, —S—, —NH—, 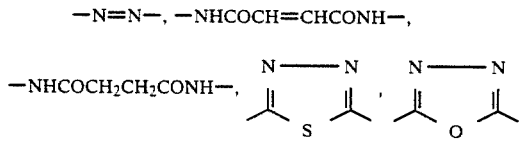

—N=N—, —NHCOCH=CHCONH—,

—NHCOCH$_2$CH$_2$CONH—, 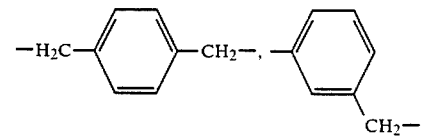

$R^{1'}$ and $R^{2'}$ are independently of each other hydrogen, optionally halogen-, preferably fluorine-, chlorine- or bromine-, hydroxyl-, $C_1$–$C_4$-alkoxy-, cyano-, amino-, mono- or di-$C_1$–$C_4$-alkylamino-substituted $C_1$–$C_4$-alkyl, fluorine-, chlorine-, bromine-, $C_1$–$C_4$-alkyl- or $C_1$–$C_4$-alkoxy-substituted aryl, preferably phenyl, $R^{3'}$ and $R^{4'}$ are independently of each other hydrogen, $C_1$–$C_4$-alkyl, $C_3$- or $C_4$-alkenyl, benzyl or phenylethyl which each can be substituted by hydroxyl, $C_1$–$C_4$-alkoxy, chlorine, bromine, or cyano and the benzyl and phenylethyl radicals additionally by $C_1$–$C_4$-alkyl, or $R^{2'}$ and $R^{3'}$ together with B and the two nitrogen atoms to which they are bonded form, if B stands for a direct bond, a $C_1$–$C_4$-alkyl-substituted hexahydropyridazine ring, if B stands for —CH$_2$—, a $C_1$–$C_4$-alkyl-substituted hexahydropyrimidine ring or, if B stands for —CH$_2$CH$_2$—, a $C_1$–$C_4$-alkyl-substituted piperazine ring, or $R^{3'}$ and $R^{4'}$ together with the nitrogen atom to which they are bonded form an optionally $C_1$–$C_4$-alkyl-substituted pyrrolidine, piperidine, morpholine, hexahydropyridazine, hexahydropyrimidine or piperazine ring, where the alkyl substituents can additionally be substituted by chlorine, bromine, hydroxyl, cyano, amino, mono-, or di-$C_1$–$C_4$-alkylamino, B has the abovementioned preferred meaning.

B can be for example: a direct bond or —CH$_2$— if $R^{2'}$ and $R^{3'}$ together with B and the two nitrogen atoms to which they are bonded form a hexahydropyridazine or hexahydropyrimidine ring;

—CH$_2$CH$_2$—, —CH$_2$CH$_2$CH$_2$—, —CH$_2$CH$_2$—NHCH$_2$CH$_2$—,

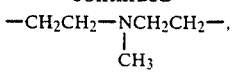

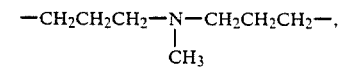

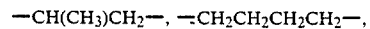

—CH(CH$_3$)CH$_2$—, —CH$_2$CH$_2$CH$_2$CH$_2$—,

—CH$_2$CH$_2$CH$_2$CH$_2$CH$_2$—, —CH(CH$_3$)CH$_2$CH$_2$CH$_2$—,

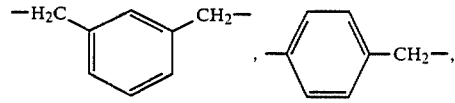

the free bond on the phenyl radical being bonded to N-$R^{2'}$.

Of the dyestuffs of the formula (II), preference is given in particular to the dyestuffs of the formula

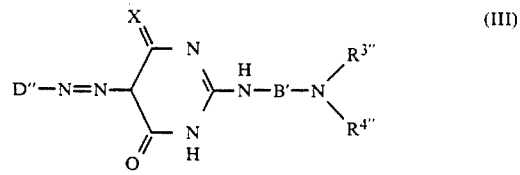 (III)

in which

D'' is a radical of the formula

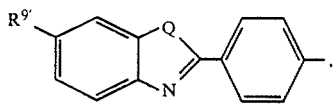

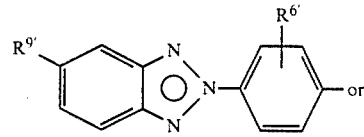

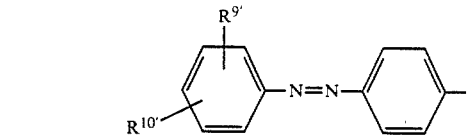

$R^{6'}$, $R^{9'}$ and $R^{10'}$ are independently of one another hydrogen, chlorine, bromine, methoxy, ethoxy, methyl or ethyl, $R^{3''}$ and $R^{4''}$ are independently of each other $C_1$–$C_4$-alkyl, β- or γ-hydroxy-$C_2$–$C_4$-alkyl or benzyl, or $R^{3''}$ and $R^{4''}$ together with the nitrogen atom to which they are bonded form a pyrrolidine, morpholine, piperidine or piperazine ring whose terminal nitrogen atom can additionally be substituted by β-hydroxyethyl, B' denotes —CH₂CH₂—, —CH₂CH₂CH₂—, —CH(CH₃)CH₂—, —CH₂CH₂CH₂CH₂—,
X denotes O or NH and
Q denotes O, S or NH.

Preferred dyestuffs of the formula (I) also include dyestuffs of the general formula

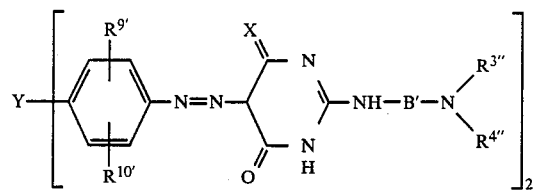
(IV)

in which R³'', R⁴'', R⁹', R¹⁰', B', X and Y have the abovementioned meaning.

The dyestuffs of the general formula (I) are obtained by diazotizing the amines of the formula

D-(NH₂)ₙ     (V)

and coupling with the iminobarbituric acids of the formula

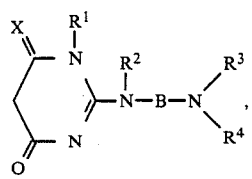
(VI)

where the symbols have the abovementioned meaning.

The barbituric acid of the formula (VI) are obtained in a manner known per se, for example as described in "The Pyrimidines" in "The Chemistry of Heterocyclic Compounds" (A. Weissberger), 1962, p. 55 et seq., by condensation of the guanidines of the formula

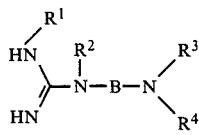
(VII)

or their salts with malonic acid derivatives of the formula

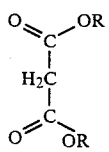
(VIIIa)

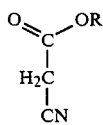
(VIIIb)

in which R is alkyl.

The guanidines of the formula (VII) are preparable by methods known per se which are described for example in Houben-Weyl, Vol. E4, p. 609 et seq., from the amines of the formula

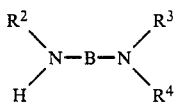
(IX)

and guanidating agents.

The diazotization of the amines (V) is effected in a manner known per se at temperatures between 0° and 50° C., using for example the following monoaminobenzenes:

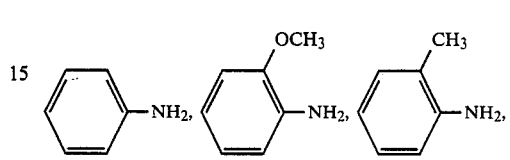

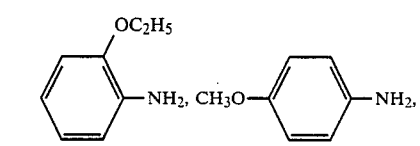

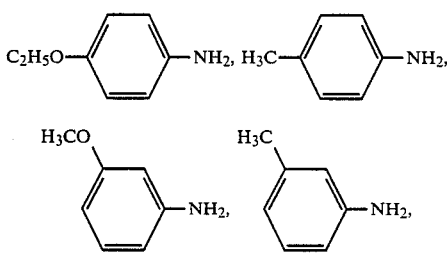

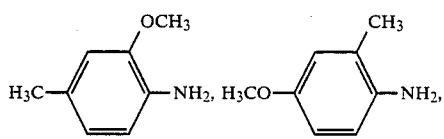

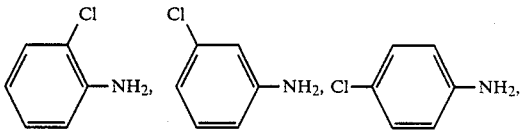

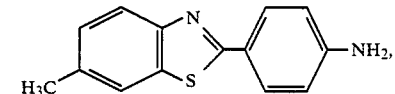

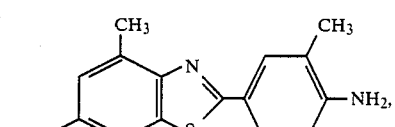

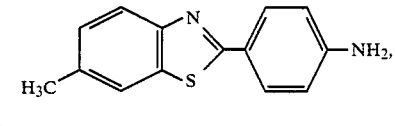

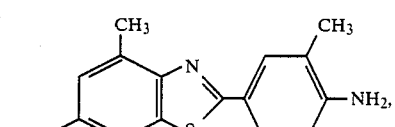

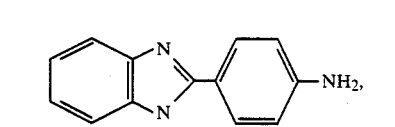

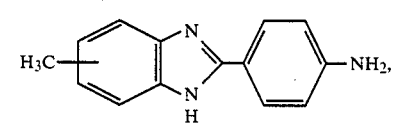

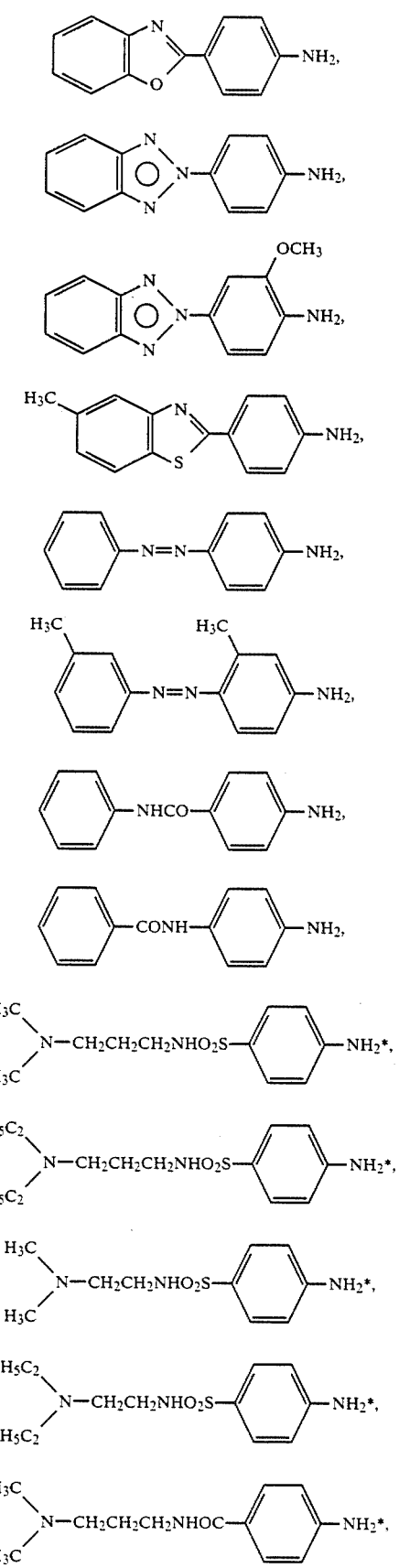
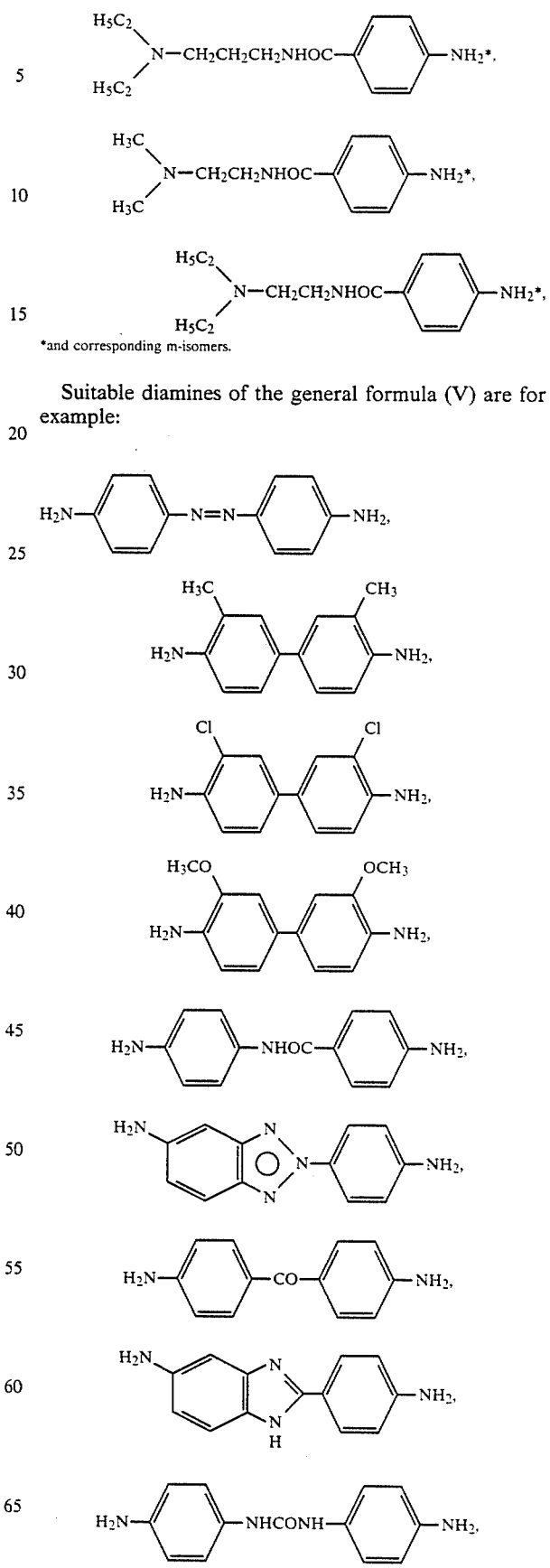
*and corresponding m-isomers.
Suitable diamines of the general formula (V) are for example:

-continued

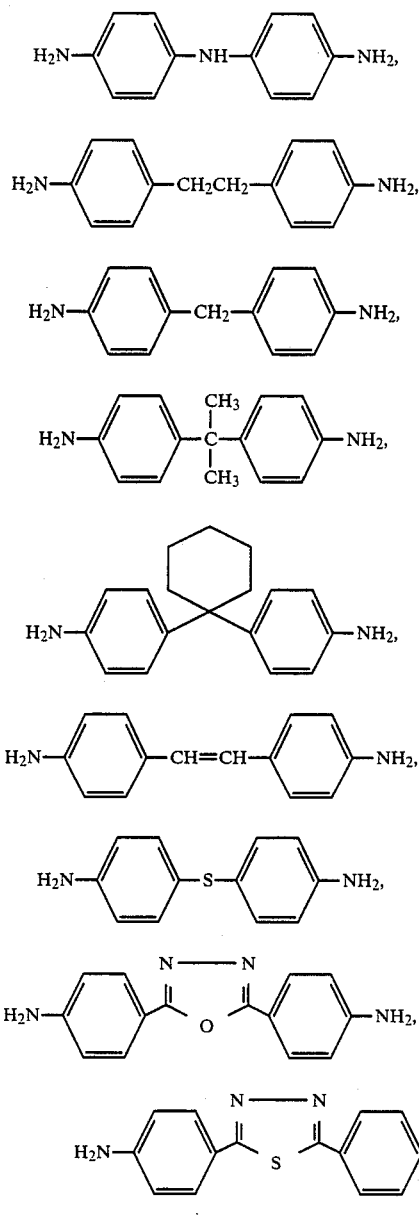

The coupling customarily takes place at temperatures between 0° and 50° C., preferably at temperatures between 0° and 30° C., and at a pH between 2 and 10, preferably between 4 and 7. The dyestuffs can be isolated and dried, but they can also be converted with suitable solvents into stable, concentrated solutions.

Such solutions are for example aqueous solutions of mineral acids and/or organic acids, for example hydrochloric acid, sulphuric acid, phosphoric acid, formic acid, acetic acid, glycolic acid, lactic acid and methanesulphonic acid.

However, the solvents used or included can also be organic solvents such as, for example, ethylene glycol, diglycol, triglycol, glycerol, ethylglycol monomethyl ether, diglycol monoethyl ether, diglycol monobutyl ether and the like.

The dyestuffs according to the invention dye cationically dyeable materials such as polyacrylonitrile, acid-modified polyesters and polyamides, wool and leather, but also cellulose-containing materials such as cotton and regenerated cellulose fibres, in particular paper in yellow shades having good fastness properties.

The dyestuffs can be used for the wet end colouring or surface colouring of paper. They are suitable for sized and for unsized types of paper starting from bleached or unbleached cellulose of different provenances, such as softwood or hardwood sulphite and/or sulphate cellulose.

The colouring is preferably effected at pH 4 to 8, in particular pH 5 to 7. The colouring temperature is in general 10° to 50° C., preferably about 20°.

The auxiliaries and fillers customary in paper colouring and manufacture can also be present if the dyestuffs according to the invention are used. The dyestuffs possess excellent affinity in the colouring of paper.

The paper colourings obtained with the dyestuffs according to the invention are notable for good water fastness (bleed fastness) and acid, alkali and alum fastness. Of particular note is the brilliance and brightness of the yellow shades. Furthermore, the compatibility with suitable dyestuffs is very good.

Preparation of Dyestuffs

EXAMPLE 1

0.072 mol = 17.4 g of (2-(4'-aminophenyl)-6-methyl-benzothiazol are suspended in 300 ml of water and 20 ml of hydrochloric acid (36% by volume). Diazotization is then effected in a customary manner with 50 ml of 10% strength sodium nitrite solution. This is followed by 1 hour of stirring and destruction of excess nitrite with sulphamic acid. This diazotization suspension is added to 217 ml ≙ 0.087 mol of a neutral aqueous solution of 2-(3-N,N-dimethylaminopropyl)aminobarbituric acid (concentration: 0.04 mol/100 ml). The pH is maintained at 6 with aqueous sodium hydroxide solution. After 3 hours the salt-containing dyestuff of the formula

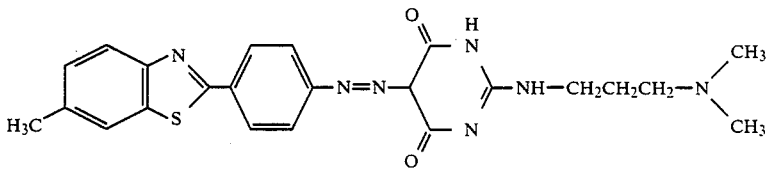

$\lambda_{max}$: 420 nm is filtered off with suction and dried. Yield: 90% of theory.

Preparation of a dyestuff solution:

40 g of the salt-containing dyestuff from Example 1 are dissolved with stirring in 100 ml of water and 60 ml of 70% strength methanesulphonic acid. Removal of small amounts of undissolved constituents by filtration leaves 218 g of dyestuff solution.

EXAMPLE 2

Example 1 is repeated, except that the coupling component used is an aqueous solution of 2-(3-N-morpholinopropyl)aminobarbituric acid, affording the dyestuff of the formula

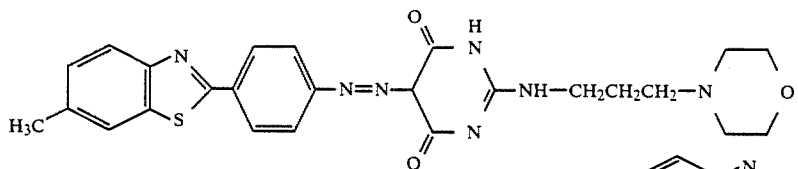

Yield: 90% of theory; λmax (nm): 424

In the same way, the replacement of the coupling components used in Example 1 and 2 with those listed in the Table below gives Examples 3-8 of the formula

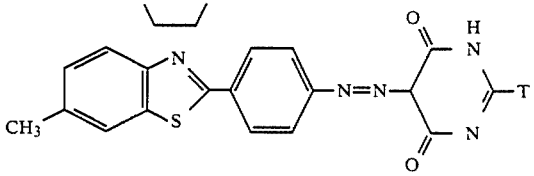

| Example | T | Shade on paper | λ$_{max}$ (nm) |
|---|---|---|---|
| 3 | HN—CH$_2$CH$_2$—N(C$_2$H$_5$)$_2$ | yellow | 420 |
| 4 | HN—CH$_2$CH$_2$CH$_2$—N(C$_2$H$_5$)$_2$ | yellow | 434 |
| 5 | 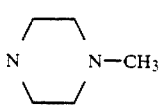 (N-methylpiperazinyl) | yellow | 424 |
| 6 | HN—C$_6$H$_4$—CH$_2$—N(CH$_3$)$_2$ | yellow | 418 |
| 7 | HN—CH$_2$CH$_2$—N(piperazinyl)NH | yellow | 424 |
| 8 | HN—CH$_2$CH$_2$CH$_2$—NH$_2$ | yellow | 426 |

EXAMPLE 9

0.029 mol=5.71 g of 4-aminoazobenzene are suspended in 100 ml of water and 8 ml of hydrochloric acid (36% by volume). After external cooling to 0°-5° C. 20 ml of 10% strength by volume of sodium nitrite solution are added dropwise. This is followed by 2.5 hours of stirring and destruction of excess nitrous acid with sulphamic acid. This diazotization suspension is added to 77 ml ≙ 0.030 mol of a neutral aqueous solution of 2-(3-morpholinopropyl)aminobarbituric acid (concentration 0.040 mol/100 ml), cooled down to 0° C. with ice. The pH is maintained at 6 with 40% strength by volume sodium hydroxide solution. After 6 hours the dyestuff of the formula

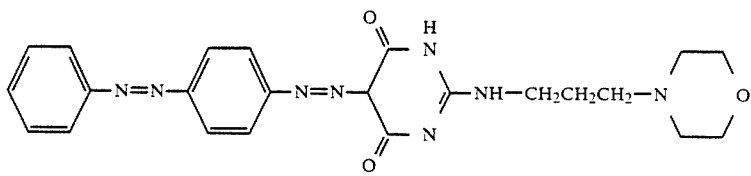

is isolated by filtering off with suction. Yield: 90% of theory; λ$_{max}$ (nm): 432.

EXAMPLE 10

0.014 mol=3.1 g of 1,2-bis(4-aminophenyl)ethane are dissolved in 80 ml of water and 8 ml of hydrochloric acid (36% by volume) at room temperature. After external cooling with ice to 0°-5° C. 20 ml of 10% strength by volume sodium nitrate solution is added dropwise in the course of 0.5 hours. This is followed by stirring at 0°-5° C. for 1 hour and destruction of excess nitrite with sulphamic acid. This diazotiazation suspension is added to 77 ml ≙ 0.030 mol of a neutral aqueous solution of 2-(3-N-morpholinopropyl)aminobarbituric acid (concentration: 0.040 mol/100 ml), cooled down to 0° C. with ice. The pH is maintained at 6 with 40% strength by volume sodium hydroxide solution. After the coupling has ended the dyestuff of the formula

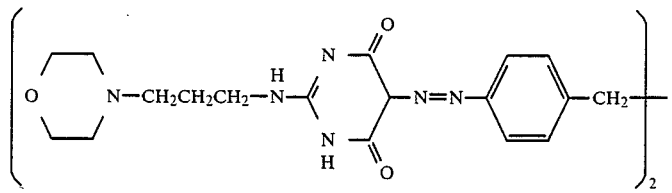

is filtered off with suction. Yield: 88% of theory; $\lambda_{max}$ (nm): 416.

EXAMPLE 11

Replacing in Example 10 the coupling component by 2-(4-N,N-dimethylaminomethylphenyl)aminobarbituric acid gives the dyestuff of the formula

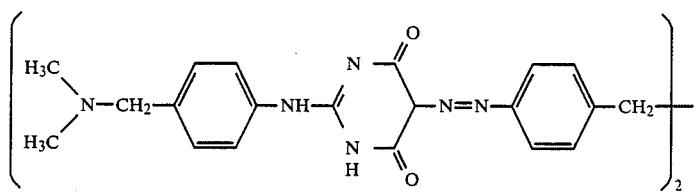

Yield: 85% of theory; $\lambda_{max}$ (nm): 408.

EXAMPLE 12

0.014 mol=3.4 g of 4,4'-diamino-N,N'-diphenylurea are suspended in 100 ml of water and 8 ml of hydrochloric acid (36% by volume). After the addition of ice, 20 ml of 10% strength by volume sodium nitrite solution at 0°–5° C. are added dropwise. This is followed by 0.5 hours of stirring and destruction of excess nitrous acid with a little sulphamic acid. The coupling is carried out with the coupling components specified in Example 10 under the conditions specified there. The dyestuff of the formula

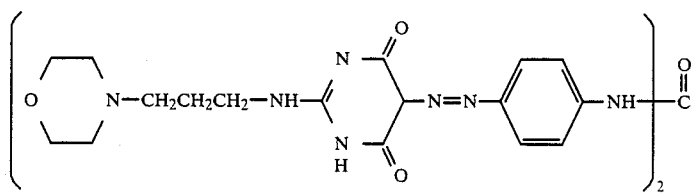

is isolated by filtering off with suction.

Yield: 85% of theory; $\lambda_{max}$ (nm): 418.

EXAMPLE 13

0.014 mol=3.5 g of 2,5-bis(4-aminophenyl)-1,3,4-oxadiazol are diazotized in the same way as the tetraazo components of Example 12. The coupling onto the coupling component specified in Example 10 gives the dyestuff of the formula

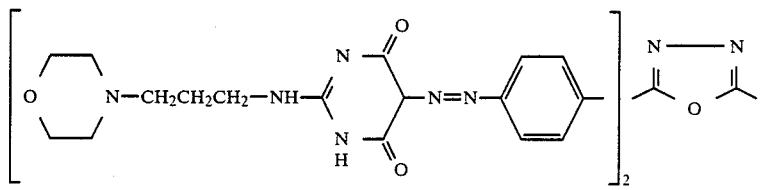

Yield: 83% of theory: $\lambda_{max}$ (nm): 420.

EXAMPLE 14

0.014 mol=3.4 g of 2-(4-amino-3-methoxyphenyl)-1,2,3-benzotriazol are suspended in 100 ml of water and 4 ml of hydrochloric acid (36% by volume), cooled down with ice to 0° C. and diazotized by addition of 10 ml of 10% strength by volume sodium nitrite solution. This is followed by 1 hour of stirring and destruction of excess nitrous acid with a little sulphamic acid. The coupling takes place onto the coupling component used in Example 10 under the conditions specified there. Filtering off with suction gives the dyestuff of the formula

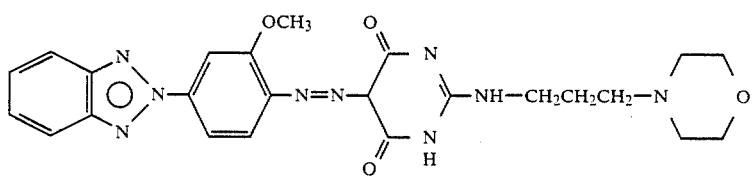

Yield: 85% of theory; $\lambda_{max}$ (nm): 448.

EXAMPLE 15

0.014 mol = 3.1 g of a mixture of 2-(4-aminophenyl)-4-methylbenzimidazole and 2-(4-aminophenyl)-5-methylbenzimidazole are diazotized in the same way as the diazocomponent in Example 14. The coupling onto the coupling component used therein gives the dyestuff of the formula

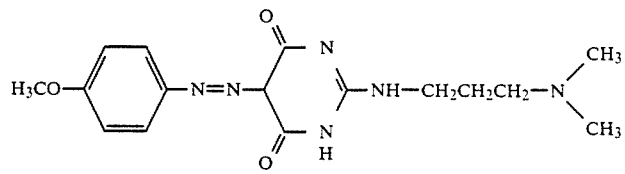

Yield: 87% of theory; $\lambda_{max}$ (nm): 418.

EXAMPLE 16

0.029 mol = 3.1 g of 4-methylaniline in a mixture cooled to 0° C. of 35 ml of water and 8 ml of hydrochloric acid (36% by volume) are diazotized with 10% strength by volume sodium nitrite solution. After excess nitrite has been destroyed with sulphamic acid, the diazotization suspension is added to 80 ml of the coupling solution used in Example 1. 35 ml of 20% strength by volume of sodium acetate solution is added dropwise, and after 6 hours, after the addition of 5% of sodium chloride, the dyestuff of the formula

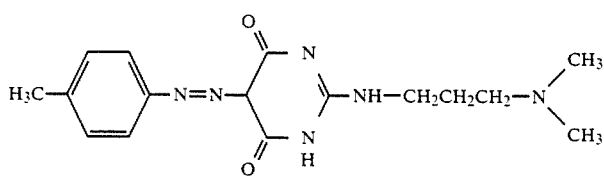

is filtered off with suction. Yield: 92% of theory; $\lambda_{max}$ (nm) 414.

The dyestuff dyes polyacrylonitrile in a bright yellow shade.

EXAMPLE 17

Example 16 is repeated, except that 4-methylaniline is replaced by 4-methoxyaniline, affording on isolation the dyestuff of the formula

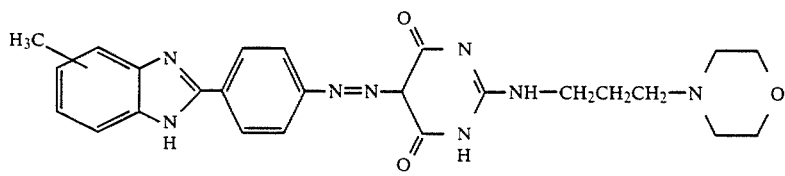

which dyes polyacrylonitrile in a bright yellow shade.
Yield: 90% of theory; $\lambda_{max}$ (nm): 430.

EXAMPLE 18

Example 1 is repeated, except that the coupling component is replaced by 2-(3-N,N-diethylaminopropyl-)amino-6-imino-barbituric acid, affording the dyestuff of the formula

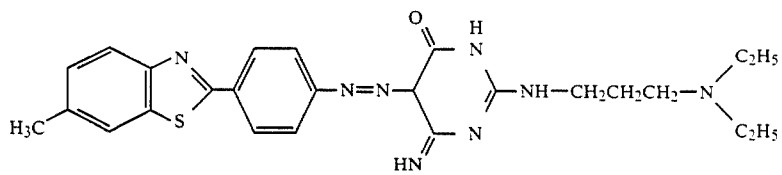

Yield: 90% of theory; $\lambda_{max}$ (nm): 434.

I claim:

1. A basic azo dyestuff of the formula

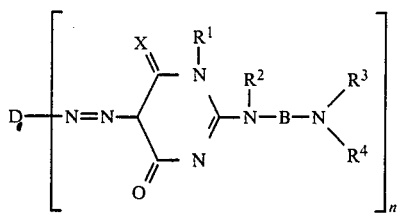

or tautomers thereof, in which
D is the radical of a diazo or tetrazocomponent free of anionic groups,
X is O or NH,
$R^1$, $R^2$ are independently of each other hydrogen, unsubstituted $C_1$–$C_8$- alkyl, $C_1$–$C_8$-alkyl substituted with halogen, hydroxyl, cyano, amino, monoalkylamino, dialkylamino or $C_1$–$C_4$-alkoxy; unsubstituted phenyl or phenyl substituted with halogen, hydroxyl, cyano, amino, monalkylamino, dialkylamino, $C_1$–$C_4$-alkoxy or $C_1$–$C_4$-alkyl,
B is a —O—, —S—,

interrupted $C_2$–$C_4$-alkylene, in which $R^5$ is hydrogen, methyl, unsubstituted $C_2$–$C_4$-alkyl, $C_2$–$C_4$-alkyl substituted with chlorine, bromine, hydroxy, cyano, $C_1$–$C_4$-alkoxy, amino, mono-$C_1$–$C_4$-alkylamino or di-$C_1$–$C_4$-alkylamino or fluorine-, chlorine-, bromine-, $C_1$–$C_4$-alkyl- or $C_1$–$C_4$-alkoxy-substituted aryl or B is

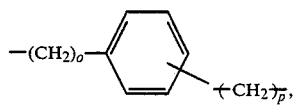

wherein o is zero, 1, 2 or 3, P is 1, 2 or 3 and $(CH_2)_p$ is bonded to the

$R^3$, $R^4$ are independently of each other hydrogen, unsubstituted $C_1$–$C_8$-alkyl, $C_1$–$C_8$-alkyl substituted with halogen, hydroxyl, cyano, amino, monoalkylamino, dialkylamino or $C_1$–$C_4$-alkoxy; $C_2$–$C_4$-alkenyl; unsubstituted benzyl, unsubstituted phenylethyl or benzyl or phenylethyl substituted with fluorine, chlorine, bromine, $C_1$–$C_4$-alkyl, $C_1$–$C_4$-alkoxy, nitro, cyano, amino, mono-$C_1$–$C_4$-alkylamino or di-$C_1$–$C_4$-alkylamino or
$R^2$ and $R^3$ together with B and the two nitrogen atoms to which they are bonded form a 5- or 6-membered heterocyclic ring and in this case B also stands for a direct bond,
$R^3$ and $R^4$ together with the nitrogen atom to which they are bonded form a 5- or 6-membered heterocyclic ring, and
n is 1 or 2.

2. A basic azo dyestuff according to claim 1 of the formula

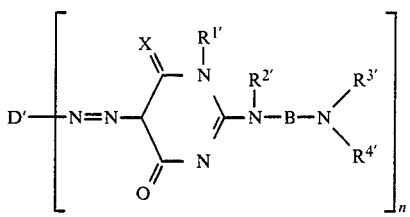

in which
n is 1 or 2,
X denotes O or NH,
D' denotes a radical of the formula

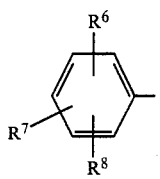

if n=1 or a radical of the formula

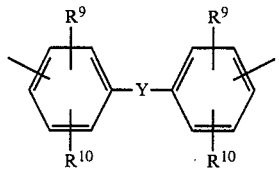

if n=2, in which
$R^6$ and $R^7$ are independently of each other hydrogen, $C_1$–$C_4$-alkyl, $C_1$–$C_4$-alkoxy, fluorine, chlorine, bromine, amino-, mono-, or di-$C_1$–$C_4$-alkylamino-substituted $C_2$–$C_4$-alkyl, $CONHR^{11}$ or $SO_2NHR^{11}$,
$R^{11}$ is $C_1$–$C_4$-alkyl, or amino-, mono- or di-$C_1$–$C_4$-alkylamino-, N-pyrrolidine-, N-morpholine-, N-piperazine-, N-hexahydropyridazine-, N-hexahydropyrimidine-substituted $C_2$–$C_4$-alkyl,
$R^8$ has independently of $R^6$ and $R^7$ the meaning specified therefor or a radical of the formula

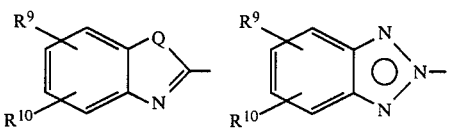

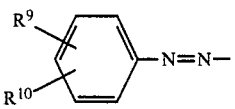

$R^9$ and $R^{10}$ are independently of each other hydrogen, $C_1$–$C_4$-alkyl, $C_1$–$C_4$-alkoxy, chlorine or bromine,
Q stands for O, S, or NH and
Y stands for a direct bond or —CONH—, —CO—, —NHCONH—, —CH$_2$—, —CH$_2$CH$_2$—, —CH=CH—, —C(CH$_3$)$_2$—,

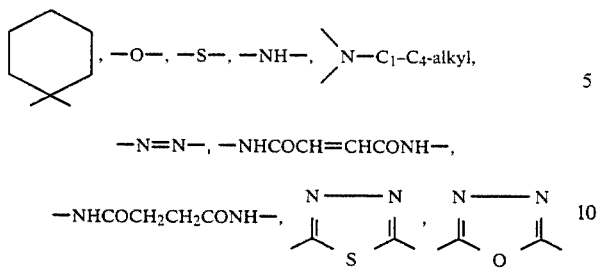

R$^{1'}$ and R$^{2'}$ are independently of each other, hydrogen, unsubstituted or halogen-, hydroxyl-, C$_1$–C$_4$-alkoxy-, cyano-, amino-, mono- or di-C$_1$–C$_4$-alkylamino-unsubstituted C$_1$–C$_4$-alkyl, or unsubstituted or fluorine-, chlorine-, bromine-, C$_1$–C$_4$-alkyl- or C$_1$–C$_4$-alkoxy-substituted phenyl, R$^{3'}$ and R$^{4'}$ are independently of each other hydrogen, C$_1$–C$_4$-alkyl, C$_3$- or C$_4$-alkenyl, benzyl or phenylethyl which each is unsubstituted or substituted by hydroxyl, C$_1$–C$_4$-alkoxy, chlorine, bromine, or cyano and the benzyl and phenylethyl radicals additionally by C$_1$–C$_4$-alkyl, or R$^{2'}$ and R$^{3'}$ together with B and the two nitrogen atoms to which they are bonded form, if B stands for a direct bond, a C$_1$–C$_4$-alkyl-substituted hexahydropyridazine ring, if B stands for —CH$_2$—, a C$_1$–C$_4$-alkyl-substituted hexahydropyrimidine ring or, if B stands for —CH$_2$CH$_2$—, a C$_1$–C$_4$-alkyl-substituted piperazine ring, or R$^{3'}$ and R$^{4'}$ together with the nitrogen atoms to which they are bonded form an unsubstituted or C$_1$–C$_4$-alkyl-substituted pyrrolidine, piperidine, morpholine, hexahydropyridazine, hexahydropyrimidine or piperazine ring, where the alkyl substituents are unsubstituted or additionally substituted by chlorine, bromine, hydroxyl, cyano, amino, mono-, or di-C$_1$–C$_4$-alkyl-amino, B stands for optionally —O—, —S—, or

interrupted C$_2$–C$_4$-alkylene, in which R$^5$ stands for hydrogen, methyl, unsubstituted or chlorine-, bromine-, hydroxyl-, cyano, C$_1$–C$_4$-alkoxy-, amino-, mono- and di-C$_1$–C$_4$-alkylamino-substituted C$_2$–C$_4$-alkyl, or fluorine-, chlorine-, bromine-, C$_1$–C$_4$-alkyl- or C$_1$–C$_4$-alkoxy- substituted phenyl or for the radical

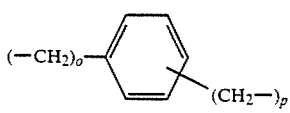

in which
o denotes 0, 1, 2 or 3 and
p denotes 1, 2 or 3 and (CH$_2$—)$_p$ is bonded to the radical NR$^3$R$^4$ and the benzene ring is unsubstituted or substituted by C$_1$–C$_4$-alkyl, C$_1$–C$_4$-alkoxy, chlorine or bromine, or for a direct bond or CH$_2$, if R$^{2'}$ and R$^{3'}$ are linked together to form a ring.

3. A basic azo dyestuff according to claim 1 of the formula

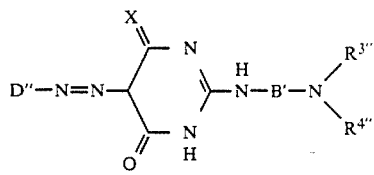

in which
X is O or NH,
D'' is a radical of the formula

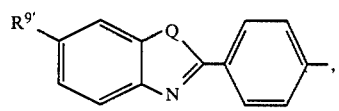

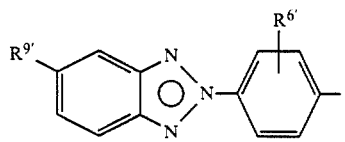

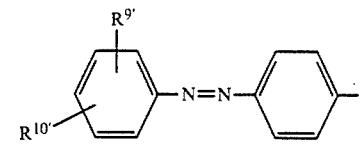

R$^{6'}$, R$^{9'}$ and R$^{10'}$ are independently of one another hydrogen, chlorine, bromine, methoxy, ethoxy, methyl or ethyl, R$^{3''}$ and R$^{4''}$ are independently of each other C$_1$–C$_4$-alkyl, β- or γ-hydroxy-C$_2$–C$_4$-alkyl or benzyl, or R$^{3''}$ and R$^{4''}$ together with the nitrogen atom to which they are bonded form a pyrrolidine, morpholine, piperidine or piperazine ring whose terminal nitrogen atom is unsubstituted or additionally substituted by B-hydroxyethyl, and Q denotes O, S or NH B' denotes —CH$_2$CH$_2$—, CH$_2$CH$_2$CH$_2$—, —CH(CH$_3$)CH$_2$—, —CH$_2$CH$_2$CH$_2$CH$_2$—.

4. A basic azo dyestuff according to claim 1 of the formula

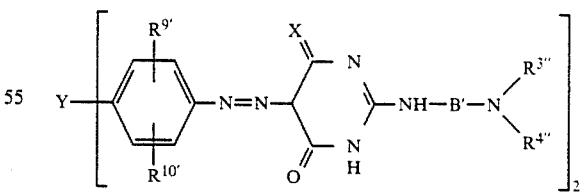

in which R$^{3''}$, R$^{4''}$, R$^{9'}$, R$^{10'}$, B', X and Y have the abovementioned meanings.

5. A basic azo dyestuff according to claim 2, wherein for R$^{1'}$ and R$^{2'}$ the halogen is selected from the group consisting of fluorine, chlorine and bromine.

* * * * *